США005175750A

United States Patent [19]
Donovan et al.

[11] Patent Number: 5,175,750
[45] Date of Patent: Dec. 29, 1992

[54] APPLICATION SPECIFIC INTEGRATED CIRCUIT FOR A SERIAL DATA BUS

[75] Inventors: Paul M. Donovan, Santa Clara, Calif.; Michael P. Caruso, Sudbury, Mass.

[73] Assignee: Apple Computer, Inc., Cupertino, Calif.

[21] Appl. No.: 407,575

[22] Filed: Sep. 15, 1989

[51] Int. Cl.$^5$ .................. H04L 7/00; H04L 25/38
[52] U.S. Cl. ................................ 375/117; 375/36; 340/709; 340/711
[58] Field of Search ............... 375/8, 9, 110, 106, 375/113, 36, 117; 340/310 R, 825.63, 709, 711; 370/49; 341/24; 395/275

[56] References Cited

U.S. PATENT DOCUMENTS

| | | | |
|---|---|---|---|
| 3,965,468 | 6/1976 | Bronson | 341/178 |
| 4,128,832 | 12/1978 | Betts | 341/89 |
| 4,146,743 | 3/1979 | Raynham | 375/110 |
| 4,189,713 | 2/1980 | Duffy | 375/25 X |
| 4,228,422 | 10/1980 | Perry | 340/310 A |
| 4,231,031 | 10/1980 | Crowther et al. | 340/825.63 |
| 4,472,686 | 9/1984 | Nishihura et al. | 375/120 X |
| 4,700,358 | 10/1987 | Duncanson et al. | 375/8 |
| 4,910,655 | 3/1990 | Ashkin et al. | 340/825.07 |
| 5,027,109 | 6/1991 | Donovan et al. | 340/706 |

FOREIGN PATENT DOCUMENTS

1519779 8/1978 United Kingdom ........... 340/825.62

Primary Examiner—Benedict V. Safourek
Assistant Examiner—Tesfaldet Bocure
Attorney, Agent, or Firm—Blakely, Sokoloff, Taylor & Zafman

[57] ABSTRACT

An application specific integrated circuit is disclosed for use with a device locatable on a serial data bus of a data communication system. Attention and synch receiving circuitry is provided for receiving an attention and synch signal being transmitted on the serial data bus for synchronizing the device in accordance with the timing of the attention and synch signals. Demodulation circuitry is provided for receiving a command byte signal and a stop bit signal being transmitted on the serial data bus. Demodulation circuitry is provided for demodulating the command byte signal. Reset circuitry is coupled to the demodulation circuitry for receiving the command byte signal if the command byte signal contains a predetermined reset code. Flush circuitry is coupled to the demodulation circuitry for receiving the command byte signal if that signal contains a predetermined flush code. The flush circuitry clears all device specific data in the integrated circuit in response to the predetermined flush code. Listen circuitry is coupled to the demodulation circuitry for receiving the command byte signal if the command byte signal contains a predetermined listen code. Talk circuitry coupled to the demodulation circuitry is provided for receiving the command byte signal if the command byte signal contains a predetermined talk code. The talk circuitry prepares the integrated circuit to transmit data from the device onto the serial data bus at a later period of time in the data bus transaction.

11 Claims, 12 Drawing Sheets

FIG_1

FIG_2

FIG_6B

FIG_6A

FIG__7

APPLICATION SPECIFIC INTEGRATED CIRCUIT FOR A SERIAL DATA BUS

CROSS REFERENCE TO RELATED APPLICATIONS

The present application is related to (1) U.S. patent application Ser. No. 07/407,570, filed on even date herewith, entitled "APPARATUS AND METHOD FOR TRANSFERRING DATA ALONG A SERIAL DATA BUS;" (2) U.S. patent application Ser. No. 07/357,419, filed May 24, 1989, entitled "APPARATUS AND METHOD FOR OPTICAL ENCODING" now abandoned, and (3) U.S. patent application Ser. No. 07/363,586, filed Jun. 8, 1989, entitled "APPARATUS AND METHOD FOR MINIMIZING UNDESIRED CURSOR MOVEMENT IN A COMPUTER CONTROLLED DISPLAY SYSTEM" now issued as U.S. Pat. No. 5,027,409 on Jun. 25, 1991.

FIELD OF THE INVENTION

The present invention relates to apparatus for transferring data between data communication devices along a serial data bus. More particularly, the present invention relates to an application specific integrated circuit for use with a device located on the serial data bus, the application specific integrated circuit implementing the data bus protocol.

BACKGROUND OF THE INVENTION

The Apple Desktop Bus (ADB) protocol utilized by Apple Computer, Inc. has been implemented by writing programming code into a microcontroller chip. Utilization of said microcontroller can be somewhat inefficient because, as a result of the general purpose and nature of said microcontroller, a certain percentage of the microcontroller might not be used.

Furthermore, said microcontroller can sometimes miss data as a result of the multiplex between ADB specific information and the interface to device specific information. In said microcontroller, functions are performed serially.

With the advent of more portable computers, such as laptop computers, the need for peripheral devices that require lower power consumption has become acute.

SUMMARY AND OBJECTS OF THE INVENTION

One objective of the present invention is to provide an application specific integrated circuit that can replace said microcontroller chip that has been used for implementing the data bus protocol.

Another objective of the present invention is to provide an application specific integrated circuit that can lessen or avoid the aforementioned deficiencies associated with the use of said microcontroller chip.

Another objective of the present invention is to provide an application specific integrated circuit that minimizes power consumption.

These and other objects of the invention are provided for by an application specific integrated circuit for use with a device locatable on a serial data bus of a data communication system. Attention and synch receiving means is provided for receiving an attention and synch signal being transmitted on the serial data bus for synchronizing the device in accordance with the timing of the attention and synch signals. Demodulation means is provided for receiving a command byte signal and a stop bit signal being transmitted on the serial data bus. The command byte signal follows the attention and synch signal. Demodulation means is provided for demodulating the command byte signal. Reset means is coupled to the demodulation means for receiving the command byte signal if the command byte signal contains a predetermined reset code. The reset means returns the integrated circuit to an initial state in response to the predetermined reset code. Flush means is coupled to the demodulation means for receiving the command byte signal if that signal contains a predetermined flush code. The flush means clears all device specific data in the integrated circuit in response to the predetermined flush code. Listen means is coupled to the demodulation means for receiving the command byte signal if the command byte signal contains a predetermined listen code. The listen means prepares the application specific integrated circuit to respond to a signal received from the serial data base at a later period of time in the data base transaction. Talk means coupled to the demodulation means is provided for receiving the command byte signal if the command byte signal contains a predetermined talk code. The talk means prepares the integrated circuit to transmit data from the device onto the serial data bus at a later period of time in the data bus transaction.

The listen means responds to a start bit signal at that later period of time. The listen means utilizes the demodulation means for responding to between 2 and 8 data bytes of information being transmitted on the serial data bus. The listen means utilizes 2-8 bytes for device specific functions. The talk means responds to a start bit signal at that later period of time. The talk means includes modulation means for transmitting between 2 and 8 data bytes of modulated information onto the serial data bus.

BRIEF DESCRIPTION OF THE DRAWINGS

The present invention is illustrated by way of example and not limitation in the figures of the accompanying drawings in which like references indicate similar elements and in which:

FIG. 8 is a logic diagram of the reset means of a preferred embodiment.

FIG. 10 is a logic diagram of the talk means of a preferred embodiment.

DETAILED DESCRIPTION

Figure 1:
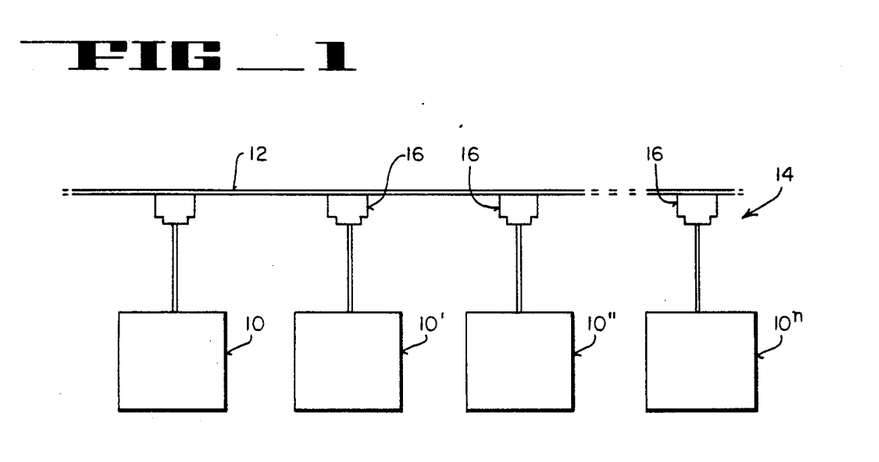
FIG. 1 illustrates a data communication network adapted to utilize the integrated circuit chip of a preferred embodiment of the present invention.

FIG. 1 of the drawings illustrates a plurality of data communication devices, designated generally as $10, 10' \ldots 10^n$, located on a serial data bus 12 of a data communication system, designated generally as 14. Such data communication devices may include a portion of a computer, such as a transceiver chip, or peripheral device such as a cursor control device (e.g., a mouse or a trackball), a keyboard, a printer or a scanner. As shown, devices $10$-$10^n$ are serially interconnected for data transfer to one another by a common data bus 12.

The various devices are coupled to cable 12 by connection modules 16 which, in a preferred embodiment, contain a passive coupling transformer, resistive and capacitive circuits, and are known in the art for coupling each of the data processing and other devices to cable 12.

As will be described, the integrated circuit of a preferred embodiment permits synchronous serial communication and data transfer between devices $10$-$10^n$. In a preferred embodiment, data is encoded as a ratio of low time to high time of each bit cell. A bit cell boundary is defined by a falling edge on the bus. A "0" is encoded as a bit cell in which the low time is greater than the high time. Therefore, a "1" is defined as a bit cell in which the low time is less than the high time.

The period for each bit cell of the command signals and low speed data transmission is nominally 100 $\mu$Sec.$\pm$30%. For high speed data transmission, the bit cell is 25 $\mu$Sec.$\pm$16%. The format of a data transaction, whether receiving or transmitting, is a start bit, followed by up to 256 bits of data and ending with a stop bit.

Figure 2:
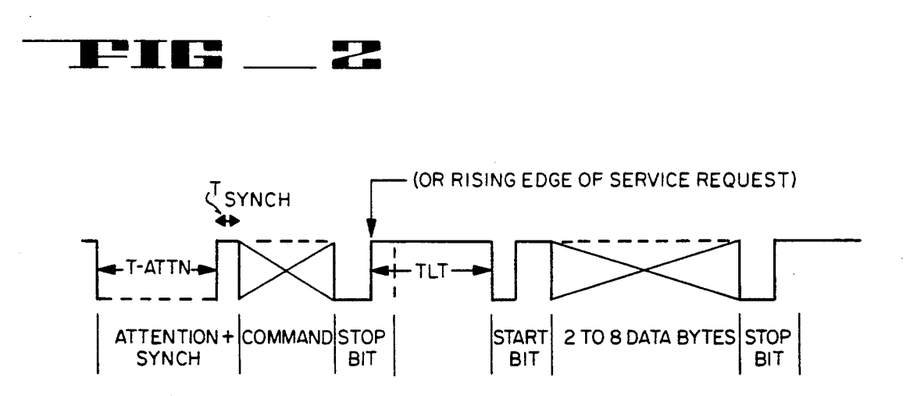
FIG. 2 is a timing diagram illustrating the protocol which is associated with the integrated circuit of a preferred embodiment.

FIG. 2 illustrates the protocol for providing transactions between a host computer and a specific device, such as a cursor control device, located on the serial data bus. As shown in this figure, to signal the start of a command, an attention pulse is sent out on the serial data bus by a host computer. An attention pulse is generated by the host computer by transmitting a bus low for a period of "T-attn." In a preferred embodiment, T-attn is approximately 560-1040 microseconds. The attention pulse is followed by a synch pulse, $T_{synch}$, to provide the initial bus timing. The following edge of the synch pulse is used as a timing reference for the first bit of the command. The command is followed by a stop bit. After the stop bit, the bus returns to its normally high state, $T_{lt}$.

The command is an 8 bit value in a preferred embodiment. The command includes a 4 bit device address field which specifies the address of the desired peripheral device (e.g., 0011 for a mouse). The next 2 bits form the command and the final 2 bits form a registered address field which allows a specific register R0-R3 within an addressed peripheral device to be specified. In a preferred embodiment, the commands have the following bit code:

| Command | Code |
|---|---|
| Flush | 0001 |
| Listen | $10R_1R_0$ |
| Talk | $11R_1R_0$ |
| Send Reset | 0000 |

The talk command orders the addressed device to provide its data, if it has data, to the host computer. The listen command orders the addressed device to accept data from the host computer and place it in one of its registers. The flush command has an effect on each device which is defined by the individual device. It can be used for such functions as clearing a register or resetting all keys on a keyboard so that they will be sent again. The SendReset command forces a hardware reset of all devices connected to the ADB.

When a peripheral device is addressed to talk, it must respond within a certain period, called the "time out" period. The time out, "$T_{lt}$", is approximately 140 to 260 microseconds (2 bit cells). The selected device, if it does not time out, becomes active on the bus and performs its data transaction (e.g. 2 to 8 data bytes) and then provides a stop bit onto the serial data bus.

Depending on the command byte (8 bits) from the host CPU, the device will either demodulate data if there was a listen command just as it did for the command byte or it will modulate data out if there was a talk command from the command byte. The command bits will either signify contained modulation of the serial data bus or will signify modulation of device specific data out onto the data bus.

Figure 3A:
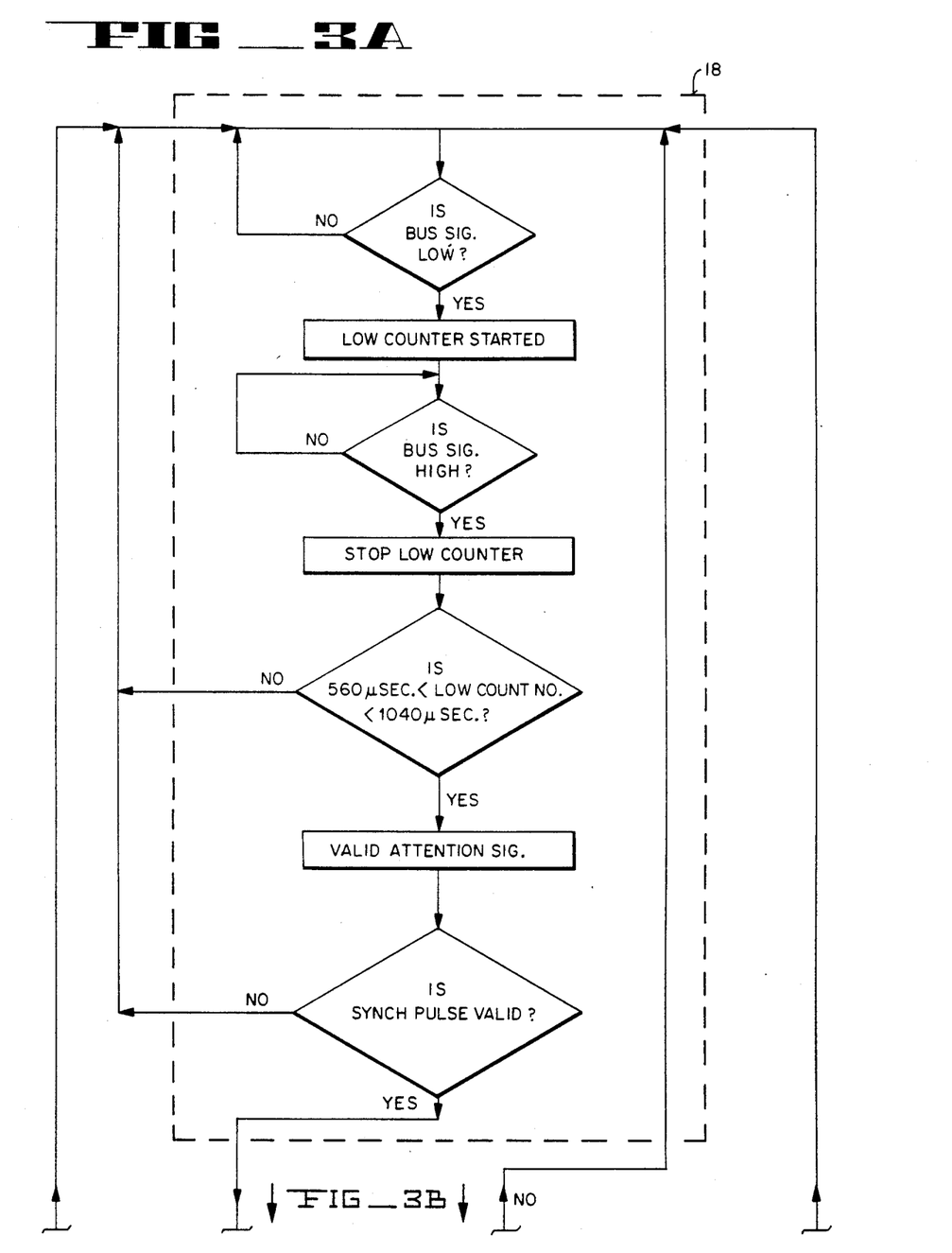
FIGS. 3A and 3B comprising flow diagrams illustrating the steps utilized by the a preferred embodiment to implement the protocol of FIG. 2.
Figure 3B:
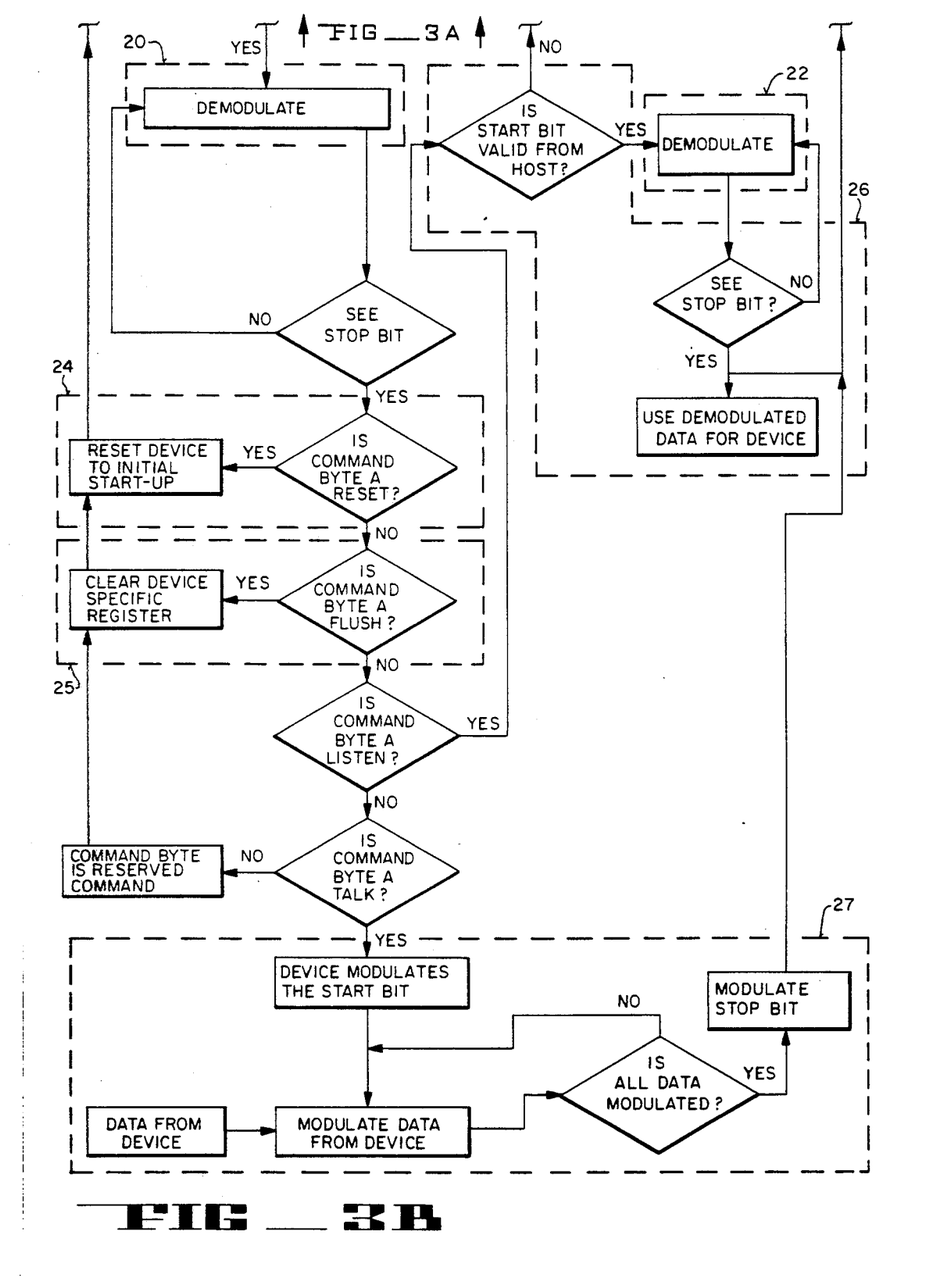

FIGS. 3A and 3B are flow diagrams illustrating the steps utilized by the present invention to implement the protocol of FIG. 2, are set forth. The portion of the flow diagram designated 18 corresponds to an attention and synch receiving means of the integrated circuit of the present invention. Portions 20, 22 illustrate the demodulation means, portion 24 illustrates the reset means, portion 25 illustrates the flush means, portion 26 illustrates the listen means, and portion 27 illustrates the talk means of the application specific integrated circuit.

Attention and synch receiving means 18 receives a signal from the serial data bus and first determines whether the bus has a low or a high signal. If the bus signal is low, a low counter is started and during this counting an evaluation is made as to whether the signal goes high. If the signal does not go high, the counter continues to count, otherwise the low counter is stopped.

An evaluation is then made as to whether the low count is between 560 $\mu$Sec. and 1040 $\mu$Sec. If not, there is an invalid attention signal and the transaction is aborted. The device begins to look for a valid attention signal.

If there is a valid attention signal, there is an inquiry as to whether there is a valid synch pulse signal. If not, the inquiry again is to whether there is a valid attention signal. If there is a valid synch pulse, the command byte is demodulated, as shown at numeral designation 20. Command byte is demodulated until a stop bit is received. Once the stop bit is received, an evaluation is made as to whether the command byte is a reset, as shown in block 24. If yes, the device is reset to initial start up.

If the command byte is not a reset, the inquiry is whether the command byte is a flush, as noted in block 25. If yes, the device specific registers are cleared. If no, the inquiry is to whether the command byte is a listen. If it is, the inquiry is whether the start bit is valid from the host, as illustrated in block 26. If the start bit is valid, the signal is demodulated, as shown in block 22. The demodulated data can be between 2 and 8 bytes. If a stop bit is not seen by the device, demodulation is continued. If the stop bit is valid, the demodulated data is used for the device while the device simultaneously looks for the next attention signal.

Referring again to the decision block which inquires whether the command byte is a listen, if the command byte was not a listen, an inquiry is made as to whether the command is a talk. If the command is not a talk, the command byte is a reserved command and then the device looks for the next attention signal. If the command byte is a talk, the device modulates the start bit, as shown in block 27. Data from the device is then modulated onto the serial data bus. Modulation continues until all data from the device is modulated. Once all data is modulated, the device modulates out a stop bit. The device looks for the next attention signal.

Figure 4:
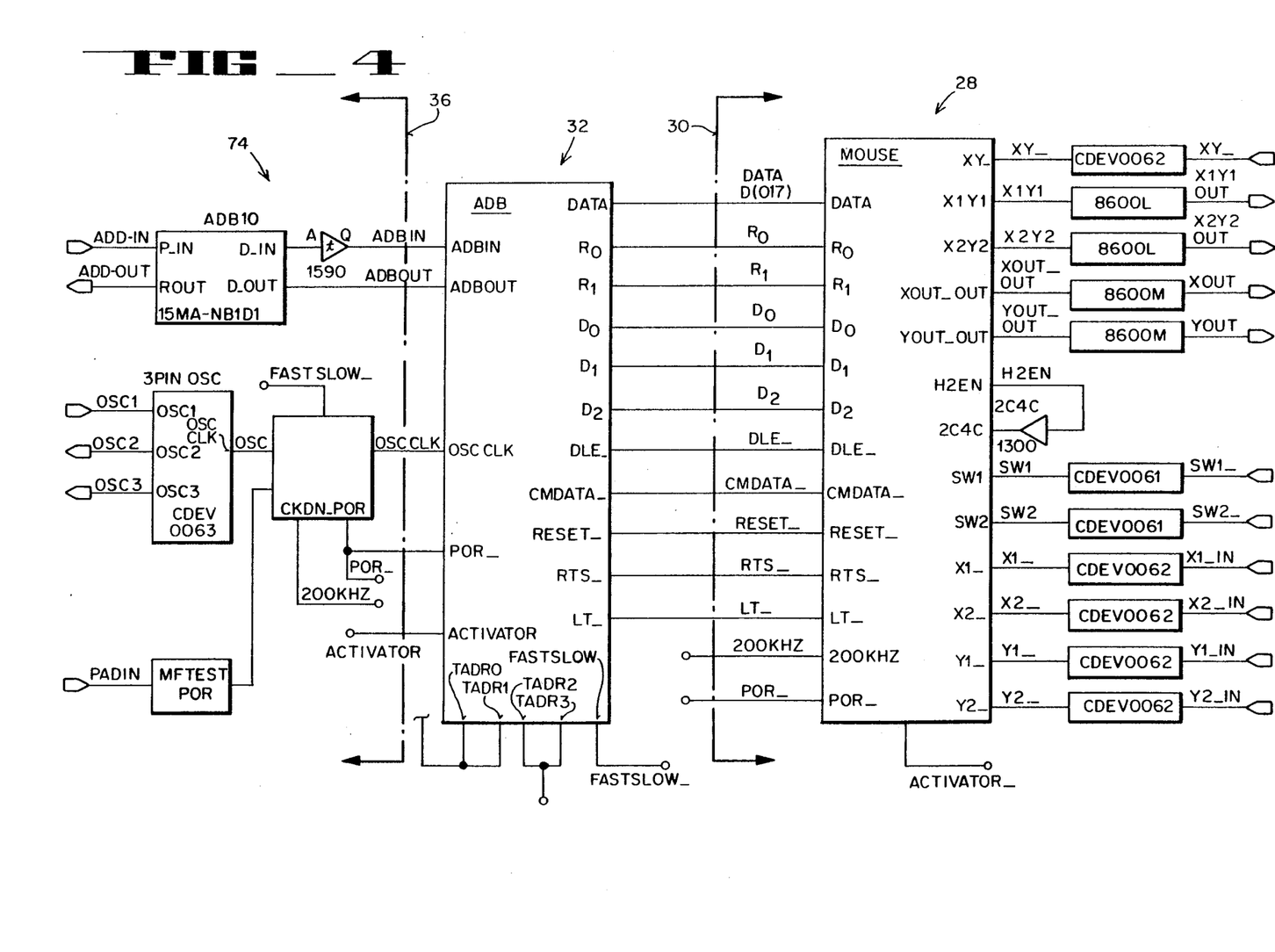
FIG. 4 is a block diagram of the application specific integrated circuit (ASIC) which implements the processes of the flow diagram of FIGS. 3A and 3B.

A specific implementation of the use of the principles of a preferred embodiment is illustrated in FIG. 4, which is a block diagram of the application specific integrated circuit (ASIC) for a mouse design. The "MOUSE" subchip of the ASIC, designated by numeral designation 28, to the right of dashed line 30, is the portion thereof used for encoding. It forms the desired pulses required for operation.

The core cell 32, identified as "ADB," illustrates the portion of the ASIC used for defining communication between the ASIC and the CPU. ADB is the abbreviation of Apple Desktop Bus. The portion 34 to the left of the dashed line 36 refers to the clock. Detailed discussions of the "MOUSE" subchip are contained in co-pending patent applications U.S. Ser. No. 07/357,419, filed May 24, 1989, entitled "APPARATUS AND METHOD FOR OPTICAL ENCODING," and U.S. Ser. No. 07/363,586, filed Jun. 8, 1989, entitled "APPARATUS AND METHOD FOR MINIMIZING UNDESIRED CURSOR MOVEMENT IN A COMPUTER CONTROLLED DISPLAY SYSTEM." The subject matter of those applications is hereby incorporated by reference.

Figures 5A, 5B:
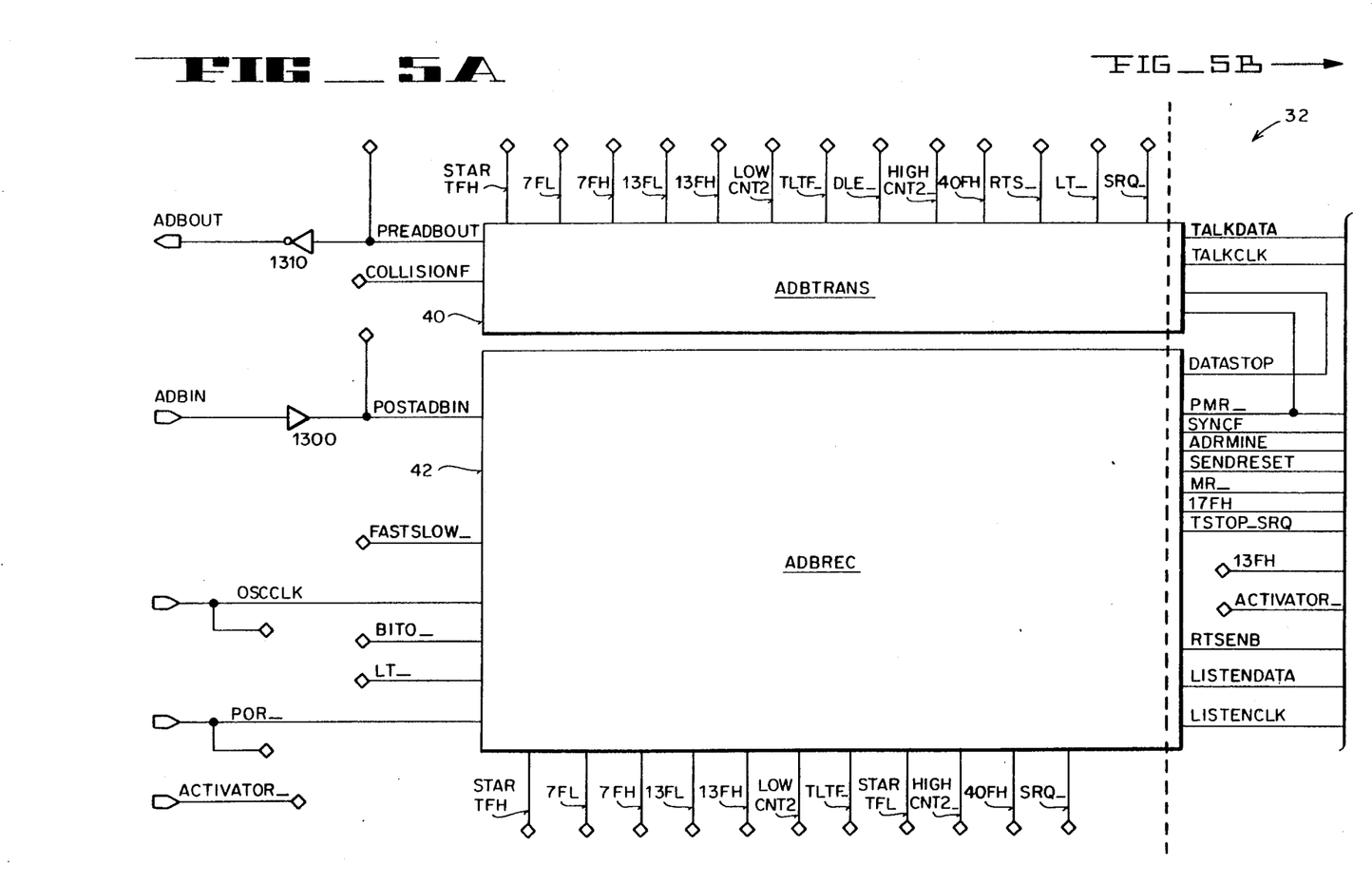
FIGS. 5A and 5B comprising lower level diagrams of the data bus subchip of the ASIC of FIG. 4.
Figure 5B:
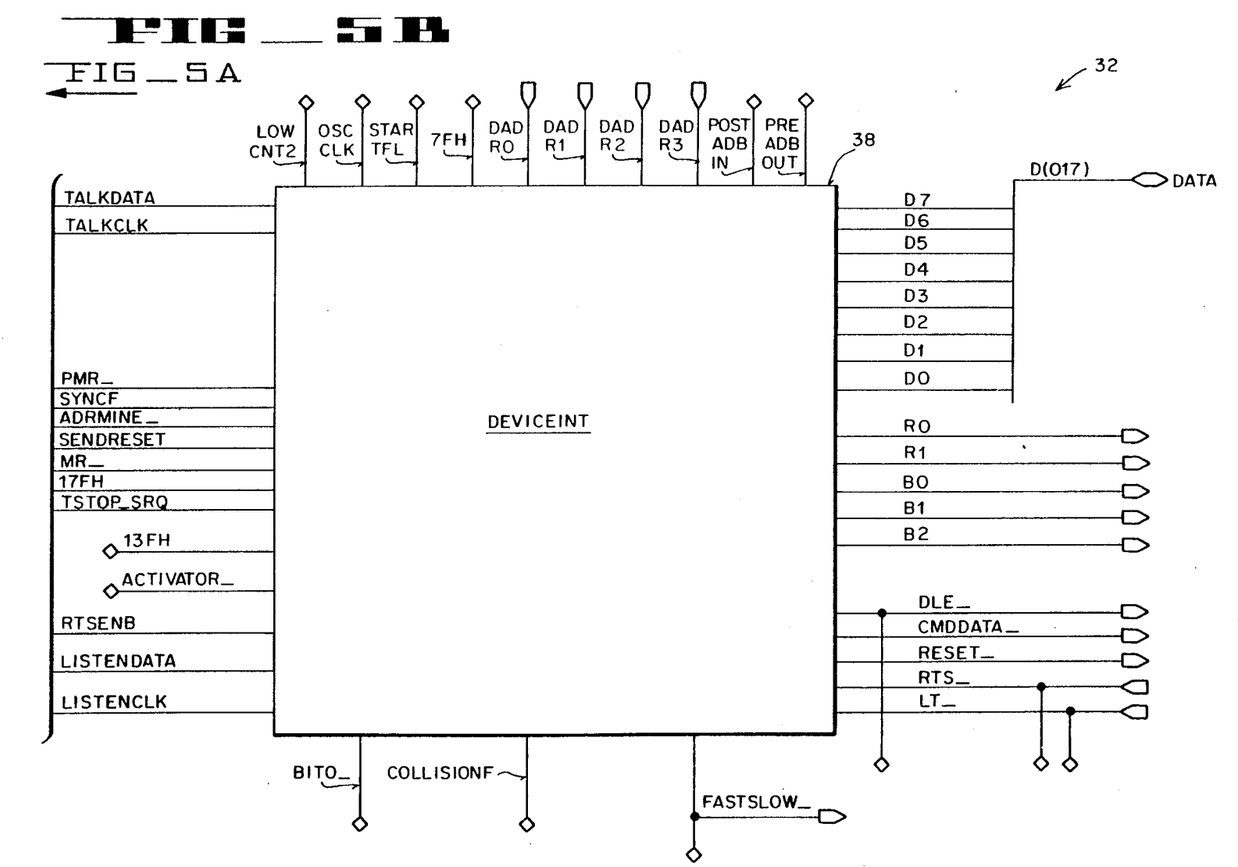

FIGS. 5A and 5B are lower level diagrams of the ADB subchip 32 are illustrated. The ADB subchip 32 includes DEVICEINT 38 which is an interface with the MOUSE subchip 28 circuitry. ADBTRANS 40 provides the transmitting means for modulating binary data received from the device while performing its pertinent function, the resulting modulated data being input onto the serial data bus. The ADBREC 42 portion includes the counting and flag means. The attention and synch means 18 and demodulation means 20, 22 are provided by the ADBREC portion 42 of the ADB subchip 32. The talk and modulation means 27 are provided by the ADBTRANS portion 40 of the ADB subchip 32. The listen means 26, reset means 24, and flush means 25 are provided by the DEVICEINT portion 38 of the ADB subchip 32.

Figure 6A:
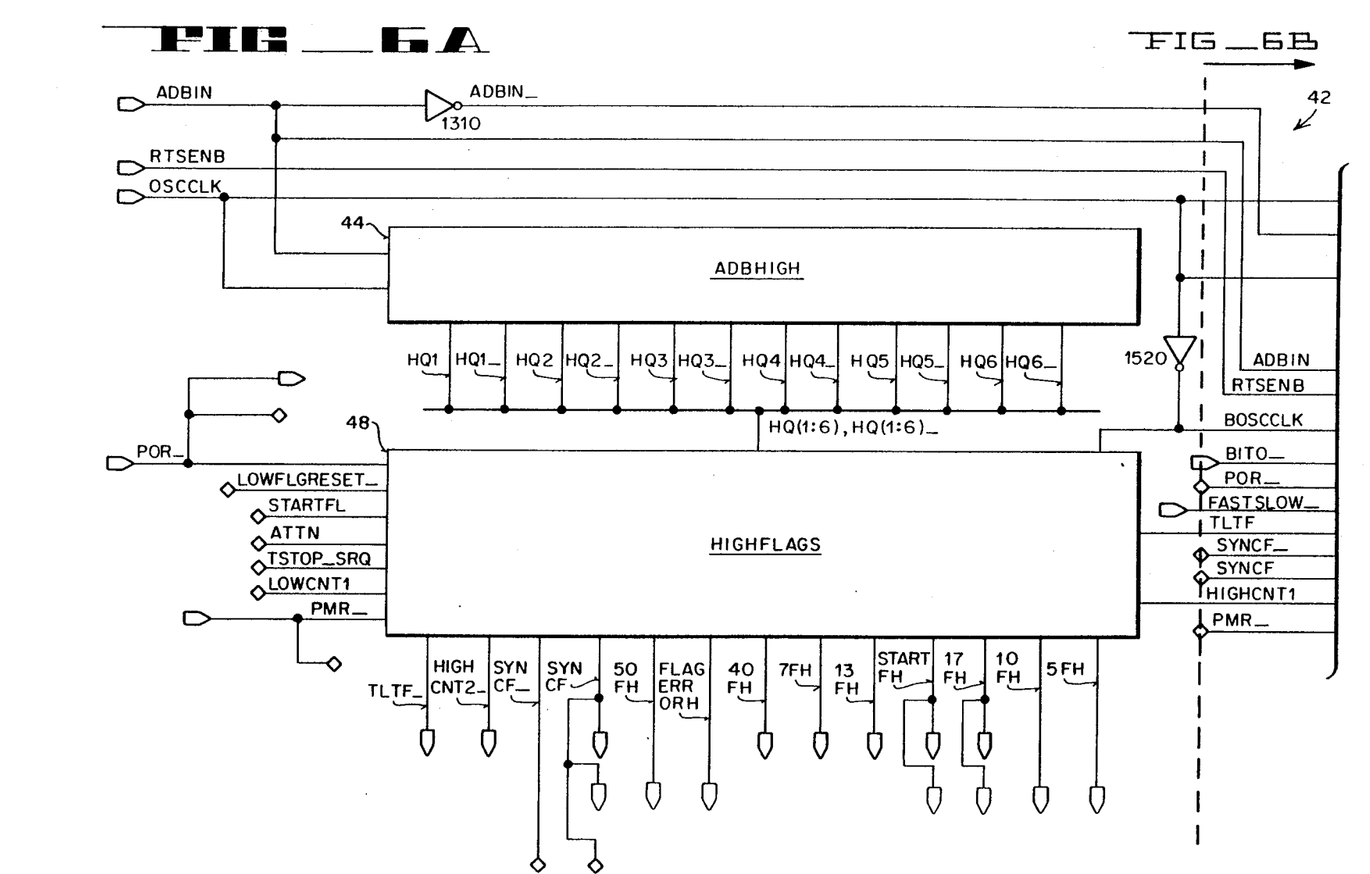
FIGS. 6A and 6B comprising lower level diagrams of a portion of the data bus subchip, illustrating the counters and flags.
Figure 6B:
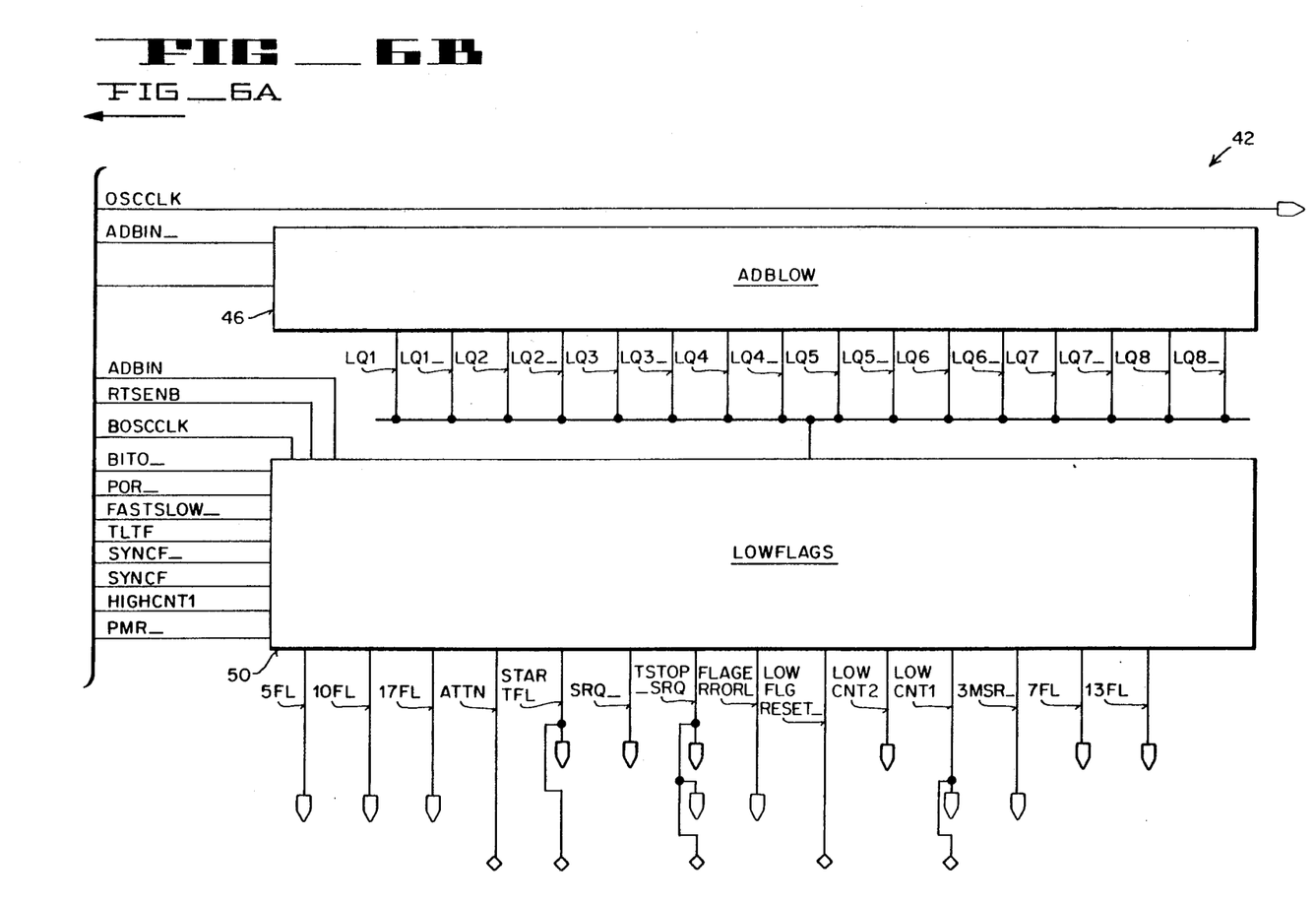

FIGS. 6A and 6B illustrate ADBREC 42. ADBREC 42 includes high counter 44 (ADBHIGH), the low counter 46 (ADBLOW), the flags associated with the high counter, i.e. HIGHFLAGS 48, and the flags associated with the low counter, i.e. LOWFLAGS 50. When the bus signal goes low, ADBLOW starts to count. When the bus signal goes high again, the ADBLOW counter stops. At this point, within the low flags block a determination is made as to whether a valid attention signal has occurred. A valid signal occurs if the flag $133_{FL}$, which represents 560 μSec., is set and the flag $197_{FL}$, which represents 1040 μSec., is not set. Once a valid attention signal has occurred, the circuitry determines if there is a valid synch pulse. A valid synch signal occurs if the flag $10_{FH}$, which represents 50 μSec., and the flag $17_{FH}$, which represents 85 μSec., is not set.

Figure 7:
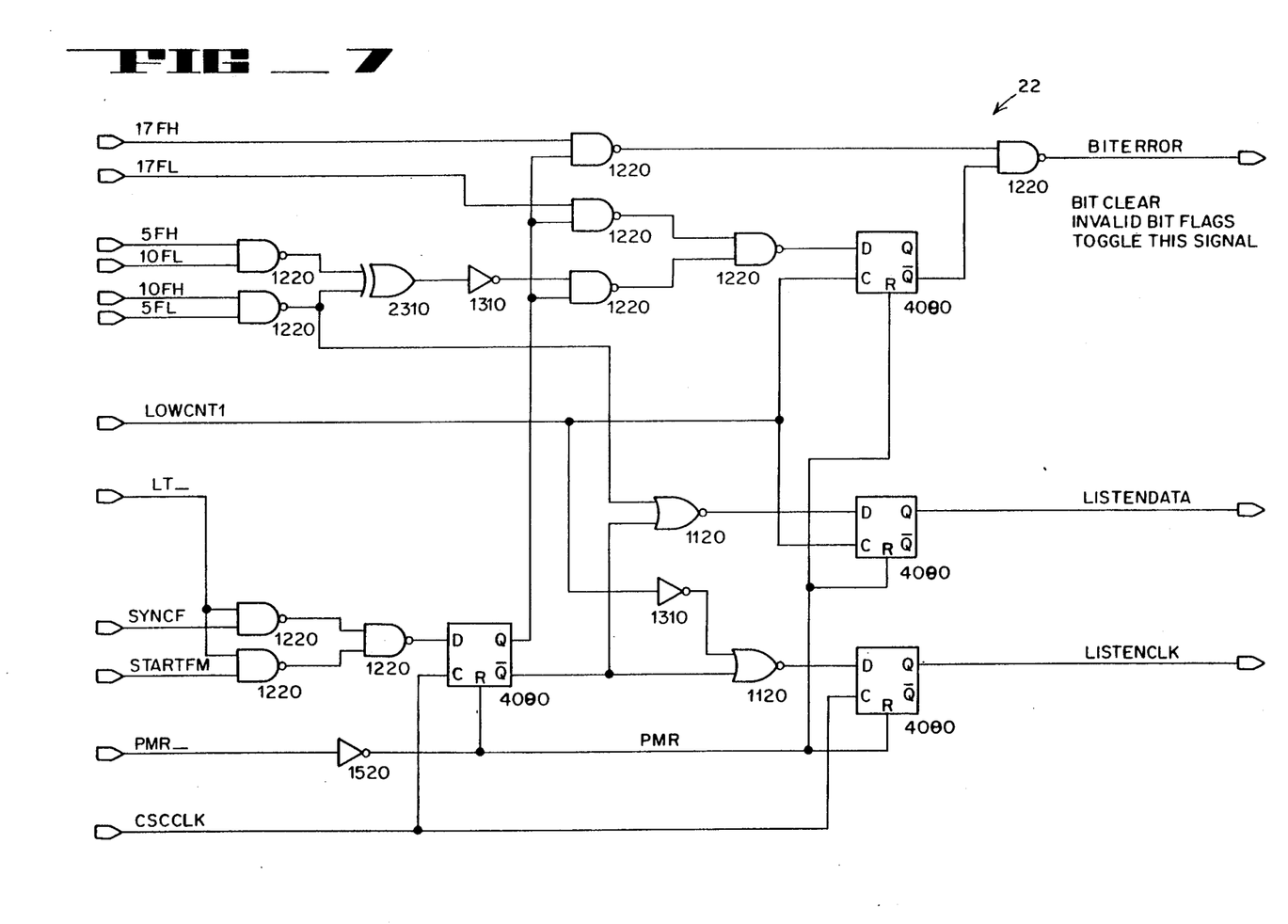
FIG. 7 illustrates the demodulation logic of the ASIC.

Referring now to FIG. 7, the demodulation logic means 22 is illustrated. If the synch flag (SYNCF) is set high then the command line will be demodulated within this block by using $5_{FL}$ (25 μSec.), $10_{FH}$ (50 μSec.), $10_{FL}$ (50 μSec.), $5_{FH}$ (20 μSec.), $17_{FL}$, and $17_{FH}$. A logic level "1" is demodulated if $5_{FL\ and\ 10FH}$ are both set. This detects an equivalent bit cell time of ⅓ low and ⅔ high. A logic level "0" is demodulated if $10_{FL}$ and $5_{FH}$ are both set. This detects an equivalent bit cell time of ⅔ low and ⅓ high. If $START_{FH}$ is set high then the data on the data bus is demodulated in the same way as the command line was with the Synch flag being set high using $5_{FL}$, $10_{FH}$, $5_{FH}$, $10_{FL}$, $17_{FH}$, and $17_{FL}$. The LT, listen-talk line, along with SYNCHF and $START_{FH}$, is used to let the receive bit decode block 22 know when to demodulate. The output LISTENDATA and LISTENCLK are coupled to the rest of the chip to allow the demodulated data to be in binary form. The bit error output, if set high by an invalid bit determined by the $17_{FL}$ and $17_{FH}$ times being reached, will cause the device to abort all data demodulation and subsequently the device will look for the next valid attention signal on the data bus.

The inputs to the demodulation logic means 22 includes $17_{FH}$, $17_{FL}$, $5_{FH}$, $10_{FL}$, $10_{FH}$, and $5_{FL}$ from the flags illustrated in FIGS. 6A and 6B. Another input is LOWCKT1 from the low counter, as illustrated in FIG. 6. LT_, from the mouse specific part of the chip, is also input. SYNC and STARTFH are also input from the counters.

Referring now to FIG. 8, a logic diagram of the reset means 24 of a preferred embodiment is illustrated. The reset circuit operates with two scenarios. In the first scenario, the command line contains a command which is decoded as a reset of the entire device. In the second scenario, there is an electrical signal error of the data bus in transmitting the data bus protocol.

In FIG. 8, the input to the circuit, SENDRESET, comes from the decoded command line logic to reset the device and look for the next valid Attention/Synch pulse combination. SENDRESET causes the output signal, MR_(master reset), to reset the entire chip. At the same time SENDRESET causes the output signal, PMR_, to reset the demodulation circuitry which prepares the demodulation circuitry to look for the next valid Attention/Synch pulse combination for the next valid protocol transaction.

If there is an error in transmitting the electrical signal protocol, the demodulation logic will detect the error and send the input signals BITERROR, FLAGERRORH, FLAGERRORL, and $50_{FH}$ to the reset means illustrated in FIG. 8. These input signals trigger the output signal PMR_. PMR_then resets the demodulation logic and causes the chip to look for the next valid Attention/Synch pulse combination.

Figure 9:
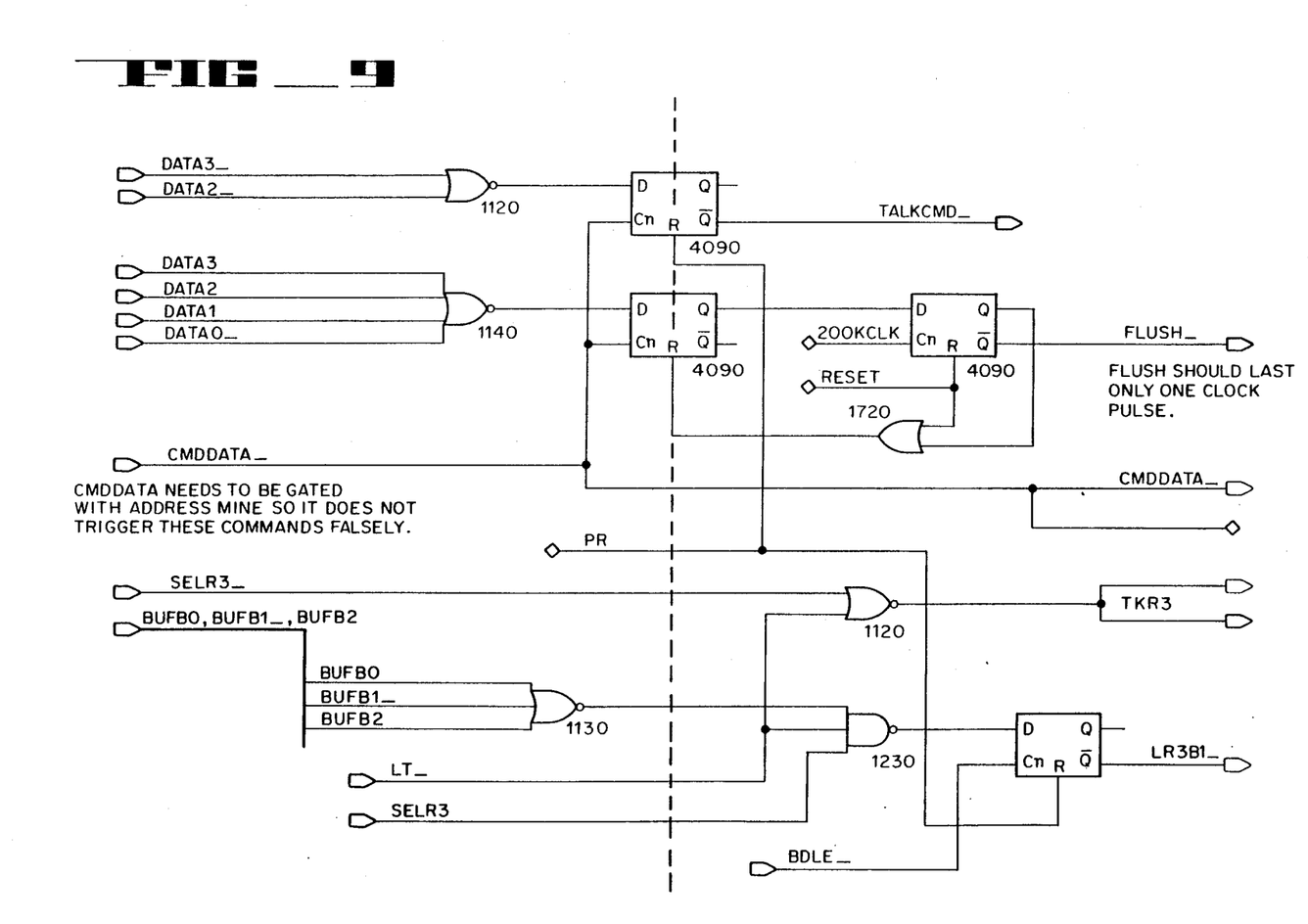
FIG. 9 is a logic diagram of the flush means of a preferred embodiment.
Figure 11:
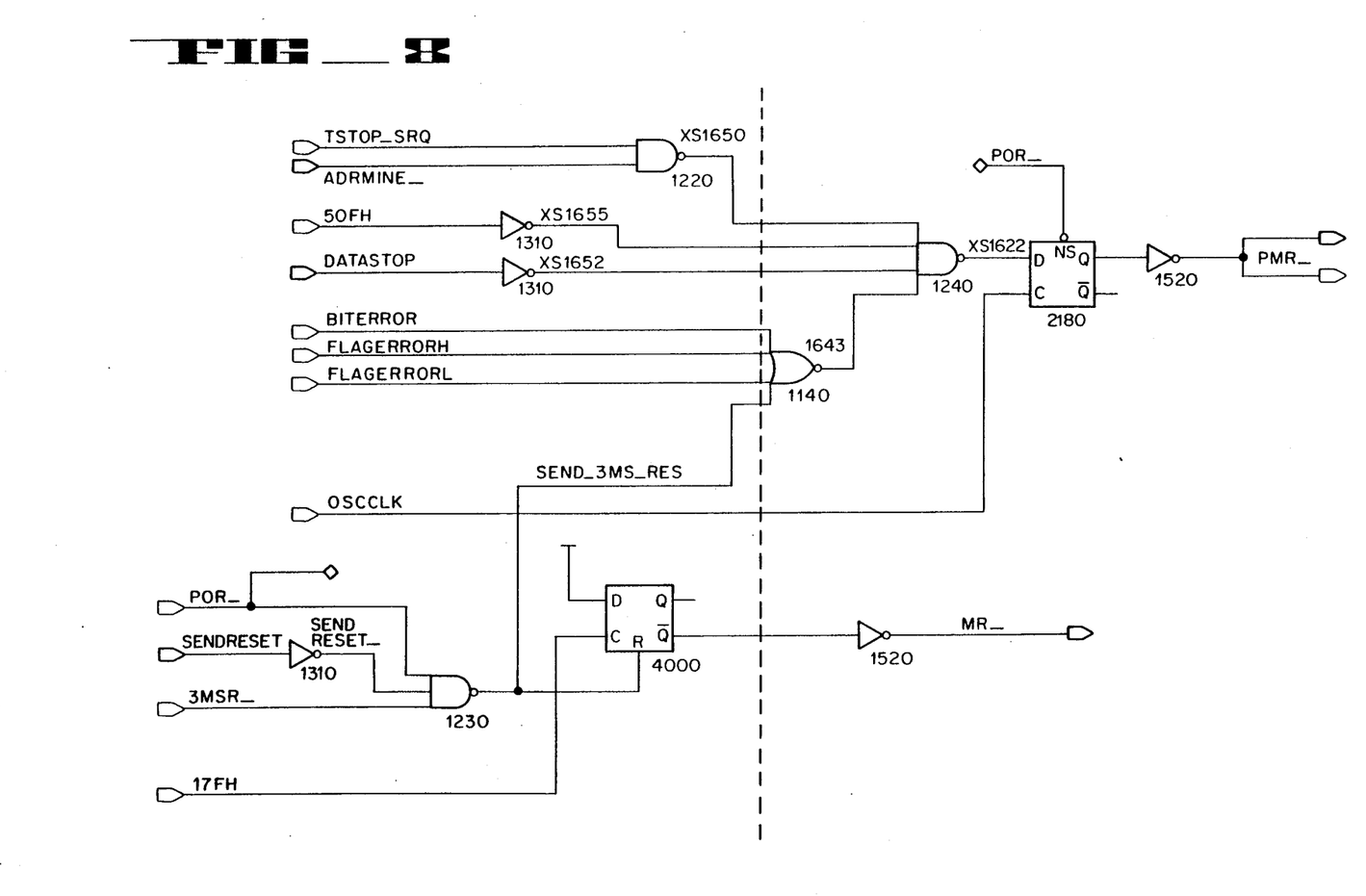

Referring now to FIG. 9, the flush means 25 of a preferred embodiment is illustrated. In FIG. 9, a command line decode block is illustrated, designated generally as 51. This block is used to determine data status from the command line. The flush command is one such command. The flush, as shown in the flow diagram of FIG. 3, is used to clear device specific registers. Inputs DATA3, DATA2, DATA1, and DATA0_represent the 4 bit code of 0001. If this command of 0001 is sent then the output FLUSH_will be activated and the device specific registers will be cleared. The other inputs and outputs in this block are used for the device specific portions of the chip.

FIG. 10 illustrates the talk means 27 (e.g. ADB-TRANS 40) of the ADB subchip 32. The input LT__, listen-talk line, comes from the device specific portion 28 of the chip. LT__is used in conjunction with the input TLTF__, stop bit to start bit time. LT__ and TLTF__ inputs determine whether the transmitter means 40 should talk onto the data bus using the modulation means. If LT__is set to talk state and TLTF__, which comes from the counter and flags block, is set high, then the ADB-TRANS 40 begins to modulate.

The STARTFH input, flag from the counter and flags block, allows the start bit to be modulated onto the data bus through the output ADBOUT shown in FIG. 10. Once the start bit is finished being modulated then the data from the device specific portion on the chip is modulated onto the data bus. This data is determined by the logic levels of $7_{FL}$ (35 μSec.), $13_{FH}$, (65 μSec.), $7_{FL}$ (35 μSec.), $13_{FL}$ (65 μSec.), and $40_{FH}$ (200 μSec.) which come from the counter and flags blocks. Additionally, the TALKDATA input line from the device interface portion of the chip helps modulate out bit cell times representing logic "1's" and "0's." Depending on the logic level of the TALKDATA line, a logic "0" or "1" is modulated into a bit cell of "0" or "1." A logic "0" is modulated by using the $13_{FL}$ and $7_{FH}$ input lines and a logic "1" is modulated by using the $7_{FL}$ and $13_{FH}$.

The other inputs to FIG. 10 are used to help regulate the talk means 27.

The output TALKCLK is used to regulate the TALKDATA input. TALKCLK goes to the device interface portion of the chip. The DATASTOP output line is used to signify the end of a transmitting means transaction to prepare the ADB subchip to look for a new Attention pulse and Synch pulse, as shown in FIG. 2, which shows a data bus transaction.

Implementation of the ADB protocol into hardware lessens or avoids many of the problems associated with the use of the above-mentioned microcontroller that has been used to implement the data bus protocol. Unlike with the use of said microcontroller, every gate is used so no valuable space is wasted. Thus, the die size is minimized for the amount of circuitry used. This results in lower cost.

Furthermore, data is not missed, given that a number of functions can be accomplished at the same time in the application specific integrated circuit. In contrast, in said microcontroller there is programmed code which cannot do multiple functions, such as keeping track of new device specific data and the ADB protocol.

Additionally, power consumption is minimized. Power is proportional to $C \times V^2 \times$ Frequency, where C=capacitance and V=voltage. Said microcontroller has, on average, a 4 or 6 megahertz clock. This is a high frequency, as compared to the ADB protocol frequency of 200 Kilohertz.

In the foregoing specification, the invention has been described with reference to specific examplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. An application specific integrated circuit of a device coupled to a serial data bus of a data communication system, wherein said device includes a plurality of device specific registers for storing device specific data, the application specific integrated circuit comprising:
   (a) attention and synch receiving means for receiving an attention and synch signal of a serial bus signal being transmitted on the serial data bus, said attention and synch receiving means synchronizing said device in accordance with the timing of said attention and synch signal;
   (b) demodulation means for receiving a command byte signal and a stop bit signal being transmitted on the serial data bus, said command byte signal following said attention and synch signal, said demodulation means for demodulating said command byte signal to form a demodulated command byte signal, wherein said attention and synch signal received by said attention and synch receiving means causes said demodulation means to start to demodulate said command byte signal;
   (c) reset means coupled to said demodulation means for receiving said demodulated command byte signal if said demodulated command byte signal contains a predetermined reset code, said reset means for returning resetable circuitor, said integrated circuit to an initial state in response to said predetermined reset code;
   (d) flush means coupled to said demodulation means for receiving said demodulated command byte signal if said demodulated command byte signal contains a predetermined flush code, said flush means for clearing said device specific data stored in the device specific registers in response to said predetermined flush code;
   (e) listen means coupled to said demodulation means for receiving said demodulated command byte signal if said demodulated command byte signal contains a predetermined listen code, said listen means for preparing to receive data from the serial data bus at a later period of time of the data bus transaction, wherein said demodulated command byte signal includes a start bit signal if said command byte signal contains said predetermined listen code, wherein said listen means responds to said start bit signal at said later period of time by utilizing said demodulation means for demodulating a plurality of data bytes of said data being transmitted from said serial data bus for device specific functions of said device; and
   (f) talk means coupled to said demodulation means for receiving said demodulated command byte signal if said demodulated command byte signal contains a predetermined talk code, said talk means for preparing to transmit said device specific data from the device onto the serial data bus at said later period of time of the data bus transaction, wherein said talk means generates said start bit signal if said demodulated command byte signal contains said predetermined talk code, said talk means including modulation means for modulating and transmitting (1) said start bit signal and (2) the plurality of data bytes of said device specific data onto said serial data bus at said later period of time, said integrated circuit minimizing any losses of data during interactions between the serial data bus and said device.

2. The application specific integrated circuit of claim 1, wherein said attention and synch receiving means includes:
   means for determining whether the serial bus signal is low;

low counting means for counting the time period of the serial bus signal when the serial bus signal is low to determine whether a valid attention pulse occurs, wherein the valid attention pulse occurs if the low counting means reaches a predetermined low count before the serial bus signal goes high, wherein the valid attention pulse does not occur if the serial bus signal does not go high after the predetermined low count;

means for determining whether the serial bus signal goes high after the predetermined low count; and high counting means for counting the time period of the serial bus signal when the serial bus signal goes high after the predetermined low count to determine if a valid synch pulse occurs.

3. The application specific integrated circuit of claim 2, wherein said predetermined low count is in the range between 560 $\mu$Sec. and 1040 $\mu$Sec.

4. The application specific integrated circuit of claim 2, wherein a valid synch pulse occurs if the high count is between 42 $\mu$Sec. and 90 $\mu$Sec.

5. The application specific integrated circuit of claim 1, wherein said demodulation means further includes means for detecting a signal error transmitted on said data bus, and wherein said reset means further includes means for resetting said demodulation means in response to said signal error detected by said detection means.

6. The application specific integrated circuit of claim 1, wherein said command byte signal and said plurality of bytes of information being transmitted include bits, each bit having a bit cell time with a nominal length of 100 $\mu$Sec.

7. The application specific integrated circuit of claim 1, wherein said stop bit signal is nominally 65 $\mu$Sec.

8. The application specific integrated circuit of claim 1, wherein the time between said stop bit signal and said start bit signal is in the range between 140 and 260 $\mu$Sec.

9. The application specific integrated circuit of claim 1, wherein said start bit signal has a nominal length of 100 $\mu$Sec.

10. The application specific integrated circuit of claim 1, wherein said device is a cursor control device.

11. The application specific integrated circuit of claim 1, wherein said device is a keyboard.

* * * * *